B. G. GOBLE.
BEARING.
APPLICATION FILED MAY 13, 1913.
1,131,694.
Patented Mar. 16, 1915.
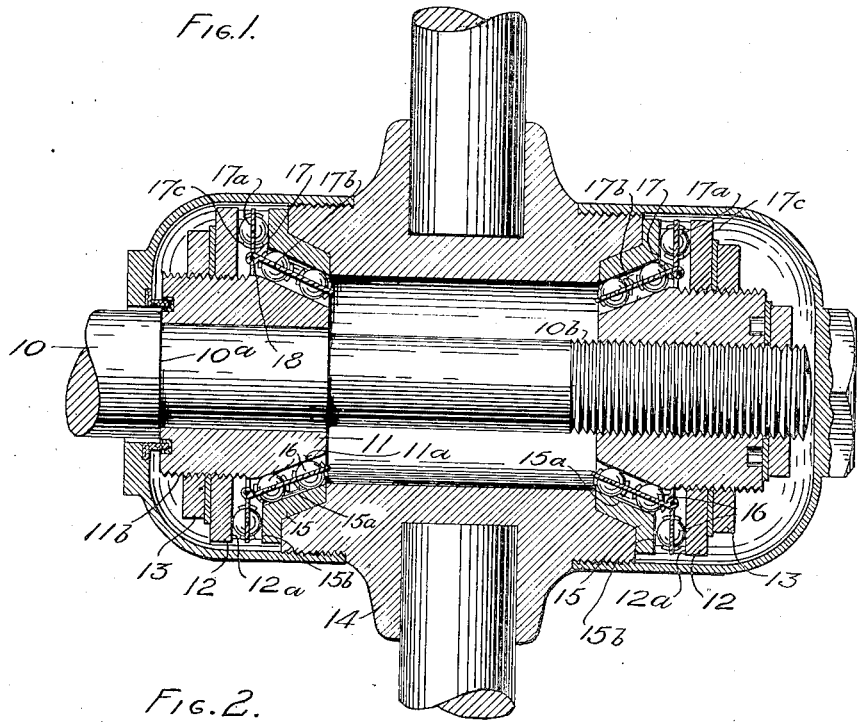
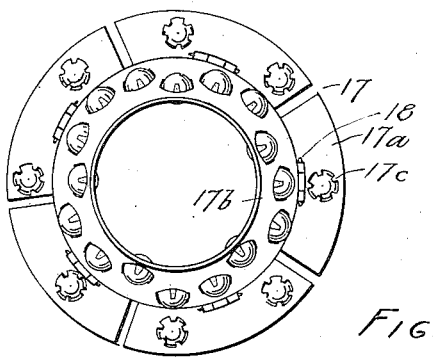
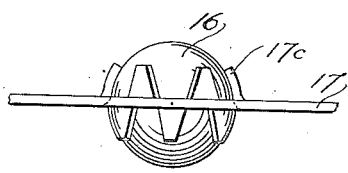
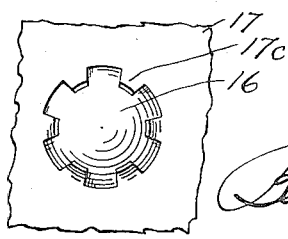
Witnesses
James Bowen
Ralph J Lamb
Inventor
Bert G Goble

UNITED STATES PATENT OFFICE.

BERT G. GOBLE, OF TULSA, OKLAHOMA.

BEARING.

1,131,694.  Specification of Letters Patent.  Patented Mar. 16, 1915.

Application filed May 13, 1913. Serial No. 767,412.

*To all whom it may concern:*

Be it known that I, BERT G. GOBLE, a citizen of the United States, and residing at Tulsa, in the county of Tulsa and State of Oklahoma, have invented certain new and useful Improvements in Bearings, of which the following is a specification.

My invention relates to improvements in bearings, and more particularly to that type employing balls as anti-friction elements.

Among the objects of my invention are: 1: To provide a "two point" bearing adjustable to take up for wear. 2: To provide a structure of this type in which the ball race-way is in the form of parallel surfaces, one of which is relatively adjustable toward and from the other. 3: To provide a structure employing a pair of axially alined spaced apart cone members, one of which is held against axial movement in one direction while the other is adjustable toward and from said relatively fixed member, each of said members carrying faces forming the walls of ball race-ways, one of the faces of each member being fixed, the other being adjustable with respect thereto. 4: To provide a structure of this type having independent ball members to provide for load and end thrust, a pre-determined number of said members being carried by a retainer adjustable to take up for wear without materially affecting the securing means for the ball members within the retainer. 5: To provide a ball retainer of angular structure in cross-section to provide for both load and end thrusts, said retainer having a somewhat pivot-like structure at the juncture of the angles to permit a slight change in angularity of the angular members for the purpose of adjustment without materially affecting the supporting points for the balls.

Other and further objects are to provide a structure which is simple and efficient in operation, durable in construction, capable of ready manipulation in assembling or taking down and which can be constructed at a relatively low cost.

To these and other ends, the nature of which will be readily understood as the invention is hereinafter disclosed, my invention consists in the improved construction and combination of parts hereinafter fully described, illustrated in the accompanying drawings, and more particularly pointed out in the appended claims.

In the accompanying drawings, in which similar reference characters indicate similar parts in each of the views: Figure 1 is a central longitudinal sectional view illustrating a preferred form of my invention, the same being shown as forming the bearing of a wheel hub on a shaft. Fig. 2 is an end view of one form of retainer with a plurality of balls carried thereby. Fig. 3 is a fragmentary sectional view showing one way in which the balls may be secured in the retainer. Fig. 4 is a fragmentary view looking at the top of Fig. 3.

As heretofore pointed out, the present invention is designed for the purpose of providing what is known as a "two point" bearing, this being a bearing in which the points of contact of the ball with its race-way are practically confined to diametrically opposite points of the ball, thus allowing the ball to move freely with a minimum surface contact with its race-way and also providing for a placing of the pressure directly through the center of the ball. One of the difficulties heretofore had in devices of this particular type is the fact that adjustments for wear could not be readily obtained, the result being that the life of the balls was materially reduced, since the complemental structures were such that it was not possible to provide for adjustments, especially where conditions with respect to both load and end thrusts were to be made. Another difficulty in this connection arises from the fact that where both load and end thrusts are to be considered, and especially where the load thrust is provided by the walls of the race-way being inclined to the axis of the bearing, taking up of wear has the effect of changing the relative positions of the retainers or cages with respect to the balls so as to place an unequal strain on the retainers and thus provide for excessive wear; while a portion of this difficulty may be overcome by providing separate retainers for the balls for the end thrust and those for the load thrust, the disadvantages arising from such construction by reason of the use of separate retainers are such as to render their use unsatisfactory, it being understood that the forming of the retainer for both as a single element or unit is of greater advantage.

The present invention is designed to overcome these objections and disadvantages and at the same time provide for all of the advantages obtainable in the use of a two point structure. Obviously, the invention may be employed in various mechanical structures, but for the purpose of explaining the idea embodied in the invention, I have shown it as applied to a wheel hub rotatively mounted on a shaft. It is to be understood of course, that this particular application is not intended to limit the scope of the invention, the latter being intended for general application.

In the drawing, 10 designates the shaft or support, preferably formed with a spindle of reduced diameter to form a shoulder 10$^a$ against which is adapted to abut a cone member 11, the latter being suitably-mounted on the spindle and being provided with a cone face 11$^a$ which is substantially straight on a cross-sectional line intersecting any portion of the face, said straight line being inclined to the axis of the member. Said member is also provided with peripheral threads 11$^b$ adapted to receive a member 12, the latter being threaded on to the member 11 and having a face 12$^a$ which is straight on a cross-section of the member at any point, said straight line being at substantially right angles to the axis of the member 11. The face 11$^a$ forms one of the walls of the load thrust, while the face 12$^a$ forms a wall of the race-way for the end thrust balls. As will be readily understood, the member 12 is adjustable longitudinally of the member 11 through the threaded connection therebetween and for the purpose of retaining it against movement when adjusted, suitable means may be employed such as a set nut 13.

14 designates the wheel hub, which is provided with an annular member 15 having faces 15$^a$ and 15$^b$, the former extending in parallelism with the face 11$^a$ while the latter extends in parallelism to the face 12$^a$, said member 15 providing the opposing walls of the two race-ways referred to, this particular construction providing for practically independent race-ways each having its opposing faces in parallelism, the race-ways combining to produce, in cross-section, an angular space to receive the anti-friction balls, designated at 16.

The balls 16 are mounted within a retainer 17, the latter being formed in two wings 17$^a$ and 17$^b$, the wings 17$^a$ being adapted to receive the end thrust balls, while the wing 17$^b$ is adapted to receive the load thrust balls. These wings, in cross-section, have their direction of length extending angularly to each other in substantial correspondence with the direction of cross-sectional length of the combined race-ways, and the two wings are preferably connected together at the point of juncture so as to provide a hinge or pivot-like connection between the two, one way of producing this result being to form spaced-apart eyes on each wing and connecting the eyes by a wire or other suitable connection indicated at 18.

The wing 17$^a$ may or may not be in the form of a complete annulus, the drawings showing this wing as in the form of a plurality of segments hingedly connected to the wing 17$^b$. It will be obvious, however, that these segments may be combined to form a single unitary annulus, such latter, however, not providing as free a pivotal movement to take up for adjustments as where the segmental form is employed, the latter permitting of a larger range of adjustment.

The balls are mounted within the wings in any suitable way, a preferred form being shown in the drawings by the use of integral tongues 17$^c$, these tongues projecting on opposite sides of the wing and bent down upon the ball after the latter is placed in position so as to form a seat for the ball within which the ball may have movement. Any suitable material may be employed for the retainer, but I prefer to employ a relatively thin sheet material, thus providing an exceedingly simple and inexpensive retainer structure as well as very light in weight. By this particular form of mounting, it will be readily understood that as wear on the balls or on the race-ways takes place, thus slightly changing the relative position of parts, the hinge-like arrangement of the wings will permit the wings to change their angularity sufficiently to accommodate for the changed conditions without affecting the normal relation of the ball to its seat, the general relation therebetween being retained since the wing tongues will permit a slight shifting in angularity without affecting this relationship. This change in angularity is provided without placing any strain on the retainer itself such as would be provided by forming the two wings as an integral structure. This effect is also had when actual adjustment is made to take up for wear, the wings and especially the one for the end thrust, accommodating itself to the changed conditions with facility.

The opposing structure is substantially similar with the exception that the shaft is peripherally threaded as at 10$^b$, and the cone member 11 is interiorly threaded to permit the member to be adjusted longitudinally of the shaft, the remaining portions of the bearing being substantially the same as those heretofore referred to.

By this general arrangement, it will be readily understood that adjustments are possible to meet all conditions. For instance, if play is provided in the race-way for end thrust at the right in Fig. 1, it would be necessary only to thread the member 12 at the right so as to bring its face into proper relation to the face 15ᵇ, this action taking place without affecting the parallel relationship between these opposing faces. If the wear is in the load race-way at this end, it is necessary only to move the member 11 at the right and, of course, adjusting the member 12 carried by it, thus providing for taking up for wear in either or both of these raceways. Similarly, end thrust wear at the left of Fig. 1 can be taken up by manipulating the member 12 at that end without affecting the load thrust race-way, while if the latter is required for adjustment for wear, it will be necessary only to permit a sufficient movement of the wheel hub to the left through manipulation of the member 12 and by manipulating the member 11 on the right to take up for any wear at this point.

As shown in Fig. 2, the balls contained in the wing 17ᵇ are arranged out of peripheral alinement, the form of retainer lending itself especially to this arrangement. In this manner, the load thrust is not confined to a single line peripherally, but can be distributed over a considerable area. The relative arrangement may be as found most convenient, as for instance, by a staggered arrangement. This particular feature is of advantage in that the wing 17ᵇ may be of any desired cross-sectional length to meet various load conditions. For instance, if the load thrust of the apparatus to which the device is applied has a relatively light maximum load thrust, the number of balls and the cross-sectional length of the wing would not need to be as great as if the maximum load thrust was comparatively great; in this latter case, the cross-sectional length of the wing would be of sufficient length to provide for a larger number of balls spaced throughout this length and thus distributing the thrust over a larger area. Another advantage in this construction lies in the fact that such distribution causes a more equal wearing on the walls of the race-way and tends to preserve the substantially straight line effect provided by the parallel walls of the race-ways. As will be readily understood, this particular arrangement provides for a true two-point structure in connection with both the load and the end thrusts, the thrust being through the center of the balls, reducing the points of contact to the least possible number and consequently reducing the friction accordingly. Furthermore, this arrangement eliminates any wedging action which might have the effect of increasing the number of points in contact, any tendency of the load thrust to force the balls into a position where additional contact is made, being resisted by the balls carried by the wing 17ᵃ, these end thrust balls acting to retain the load thrust balls in proper position and free from a wedging or binding action, the two point contact permitting a maximum freedom of movement of the balls in use.

While I have herein shown and described my invention generally, it will be readily understood that changes and modifications therein may be required or desired to meet the various exigencies of use, and I desire it to be understood that I reserve the right to make any and all such changes as may be required or found desirable in so far as the same may fall within the spirit and scope of the invention as expressed in the accompanying claims.

Having thus described my invention, what I claim as new is:—

1. In a device of the character described, a cone member, a complementary member having faces extending angularly to each other, one of said faces opposing the cone member, a member carried by the cone member and having a face opposing the adjacent face of said complementary member, said opposing faces forming a race-way, a portion of which is vertically-disposed and the remainder inclined with respect to the axis of the cone member, a ball cage carrying rolling elements located in said race-way, and means for adjusting said cone member.

2. In a device of the character described, a cone member and a complemental member positioned to form an annular ball race-way, said raceway being angular in cross-section, to provide independent communicating portions for end and load thrusts, and a ball cage therein formed with pivotally connected ball-carrying wings, said wings in cross-section approximating the angularity of the race-way and carrying rolling elements in each of the angular portions.

3. In a device of the character described, a cone member and a complemental member positioned to form an annular ball race-way, said race-way being angular in cross-section with its opposing faces in parallelism to provide independent communicating portions for end and load thrusts, and a ball cage therein formed with pivotally connected ball-carrying wings, said wings in cross-section approximating the angularity of the race-way and carrying rolling elements in each of the angular portions.

4. In a device of the character described, a cone member and a complemental member positioned to form an annular ball race-way, said race-way being angular in cross-section with its opposing faces in parallelism to provide independent communicating portions for end and load thrusts, and a ball cage therein formed with pivotally connected ball-carrying wings, said wings in cross-section approximating the angularity of the race-way and carrying rolling elements in each of the angular portions, said race-way having its walls relatively adjustable to take up for wear.

5. In a device of the character described, a cone member and a complemental member positioned to form an annular ball race-way, said race-way being angular in cross-section with its opposing faces in parallelism, and a ball cage therein formed with ball-carrying wings, said wings in cross-section approximating the angularity of the race-way, said wings being jointed together to permit change in angularity under such wear adjustment.

6. A ball cage formed with ball-carrying wings extending angularly to each other and jointed to permit change in angularity.

7. A ball cage formed with ball-carrying wings extending angularly to each other and jointed to permit change in angularity, one of said wings being formed in sections.

8. A ball cage formed with ball-carrying wings extending angularly to each other and jointed to permit change in angularity, one of said wings being formed with a plurality of segmental members normally lying in substantially the same plane.

In testimony whereof I affix my signature in presence of two witnesses.

BERT G. GOBLE.

Witnesses:
FRANK BARNES,
H. L. THOMPSON.